United States Patent
Hildebrand et al.

(10) Patent No.: US 6,923,836 B2
(45) Date of Patent: *Aug. 2, 2005

(54) PREPARATION OF DYED PLASTICS OR POLYMERIC DYE PARTICLES

(75) Inventors: Rainer Hildebrand, Lörrach (DE); Peter Sutter, Muttenz (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 10/451,172

(22) PCT Filed: Dec. 13, 2001

(86) PCT No.: PCT/EP01/14691

§ 371 (c)(1), (2), (4) Date: Jun. 20, 2003

(87) PCT Pub. No.: WO02/051924

PCT Pub. Date: Jul. 4, 2002

(65) Prior Publication Data

US 2004/0045102 A1 Mar. 11, 2004

(30) Foreign Application Priority Data

Dec. 22, 2000 (CH) ............................................. 2509/00

(51) Int. Cl.$^7$ ................................................. C09B 5/34
(52) U.S. Cl. ...................... 8/506; 5/510; 5/512; 5/513; 5/514; 5/515; 5/516; 5/677; 922/924; 922/926; 922/927

(58) Field of Search .................... 8/506, 677, 510–516, 8/922–927; 546/38

(56) References Cited

U.S. PATENT DOCUMENTS

| 1,002,066 A | * | 8/1911 | Luttringhaus ................. 546/58 |
| 1,690,913 A | * | 11/1928 | Unger et al. ................... 546/38 |
| 2,031,406 A | * | 2/1936 | Bruck ........................... 546/58 |

FOREIGN PATENT DOCUMENTS

| FR | 2192142 | | 2/1974 |
| GB | 1022652 | | 3/1966 |
| GB | 1385003 | * | 2/1975 |

* cited by examiner

*Primary Examiner*—Margaret Einsmann
(74) *Attorney, Agent, or Firm*—Kevin T. Mansfield

(57) ABSTRACT

The present application relates to a process for preparing dyed plastics or polymeric dye particles characterized in that it comprises mixing a high molecular weight organic material with a coloristically effective amount of at least one dye of the formula where $R_1$ is hydrogen, hydroxyl or a radical —NHCO—$R_6$, where $R_6$ is $C_1$–$C_6$alkyl or unsubstituted or $C_1$–$C_4$alkyl- or halogen-substituted phenyl, $R_2$ is hydrogen, hydroxyl or a radical W—$R_7$, where W is —NHCO— or —S— and $R_7$ is $C_1$–$C_6$alkyl or unsubstituted or $C_1$–$C_4$alkyl- or halogen-substituted phenyl, $R_3$ is hydrogen, $R_4$ is hydrogen or hydroxyl, $R_5$ is hydrogen, or $R_3$ and $R_4$ combine to form the radical of the formula, where the rings A and B may independently bear further substituents.

4 Claims, No Drawings

PREPARATION OF DYED PLASTICS OR POLYMERIC DYE PARTICLES

The present invention relates to a process for preparing dyed plastics or polymeric dye particles.

Processes for mass dyeing plastics with dyes are known. However, it has been determined that the dyes hitherto used do not always fully meet the highest requirements, especially with regard to hot light fastness. There is accordingly a need for novel coloration processes which produce light fast and especially hot light fast colorations and exhibit good general fastnesses.

It has now been found that, surprisingly, the coloration process of the invention substantially meets the criteria indicated above.

The present invention accordingly provides a process for preparing dyed plastics or polymeric dye particles, characterized in that it comprises mixing a high molecular weight organic material with a coloristically effective amount of at least one dye of the formula

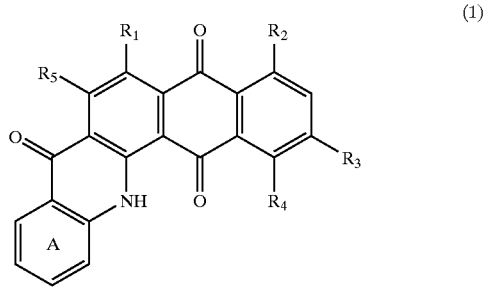

(1)

where $R_1$ is hydrogen, hydroxyl or a radical —NHCO—$R_6$, where $R_6$ is $C_1$–$C_6$alkyl or unsubstituted or $C_1$–$C_4$alkyl- or halogen-substituted phenyl, $R_2$ is hydrogen, hydroxyl or a radical W—$R_7$, where W is —NHCO— or —S— and $R_7$ is $C_1$–$C_6$alkyl or unsubstituted or $C_1$–$C_4$alkyl- or halogen-substituted phenyl, $R_3$ is hydrogen, $R_4$ is hydrogen or hydroxyl, $R_5$ is hydrogen, or $R_3$ and $R_4$ combine to form the radical of the formula

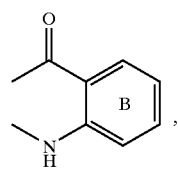

where the rings A and B may independently bear further substituents.

Useful optional substituents for the rings A and B include in particular halogen, $C_1$–$C_4$alkyl and $C_1$–$C_4$alkoxy. They may be present more than once.

$C_1$–$C_6$Alkyls $R_6$ and $R_7$ include for example methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 1-methylpentyl, neopentyl, cyclopentyl, cyclohexyl and the associated isomers.

$C_1$–$C_4$Alkyl as a substituent on phenyl or as a substituent on the rings A and B is methyl, ethyl, propyl, isopropyl, n-butyl, isobutyl, sec-butyl and tert-butyl.

$C_1$–$C_4$Alkoxy as a substituent on the rings A and B is for example methoxy, ethoxy, propoxy and butoxy.

Halogen is bromine, iodine and especially chlorine.

$C_1$–$C_6$Thioalkyl W—$R_7$ is for example methylthio, ethylthio, propylthio or butylthio.

Of the dyes of the formula (1), blue dyes of the formulae

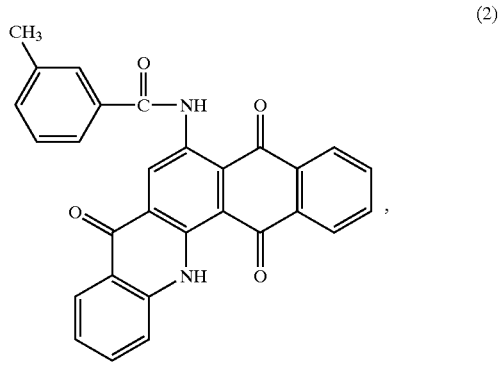

(2)

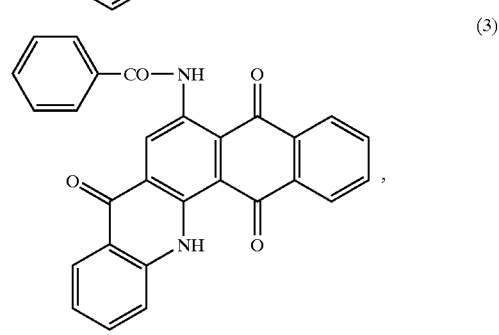

(3)

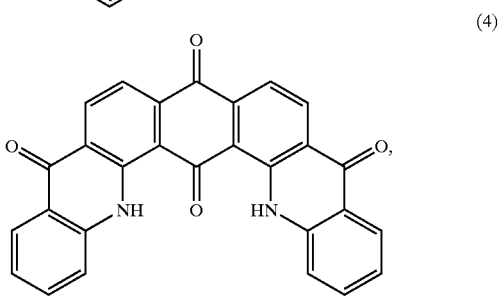

(4)

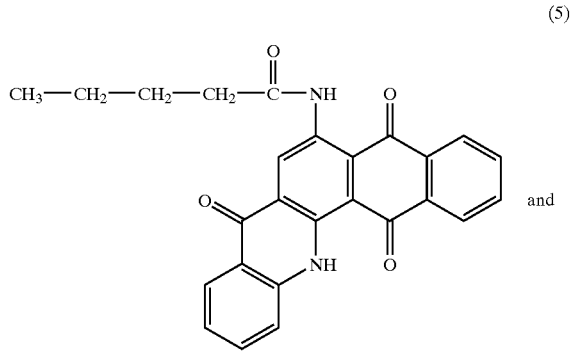

(5)

and

-continued (6)

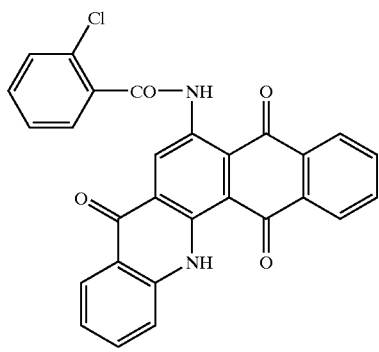

are preferred.

Preference, among the dyes of the formula (1), is likewise given to the red dyes of the formulae (7)

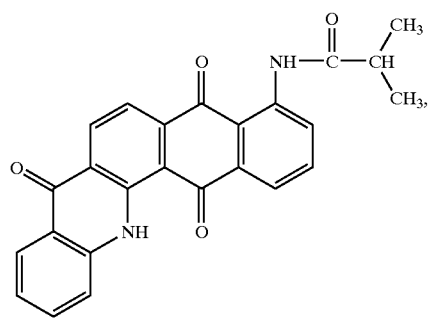

(8)

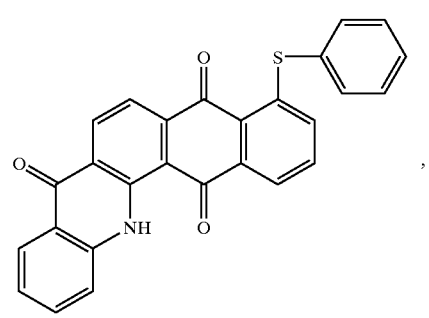

, (9)

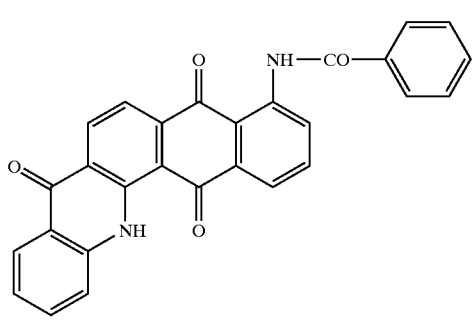

and (10)

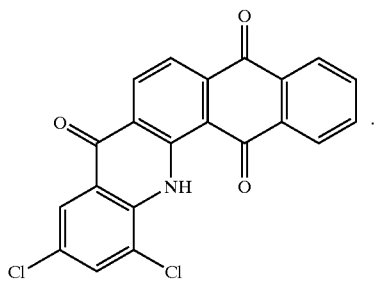

Particular preference is given to the dyes of the formulae (2) and (7).

The dyes used according to the invention are known or preparable similarly to known compounds by generally known methods.

The dyes of the formula (1) which are used according to the invention are prepared for example by ring closure of compound of a formula (50)

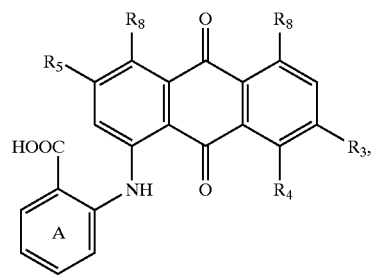

where A, $R_3$, $R_4$ and $R_5$ are each as defined under the formula (1) and one of the $R_8$ substituents is —$NH_2$ and the other is $R_1$ or $R_2$, in chlorosulfonic acid to form the compound of the formula (51)

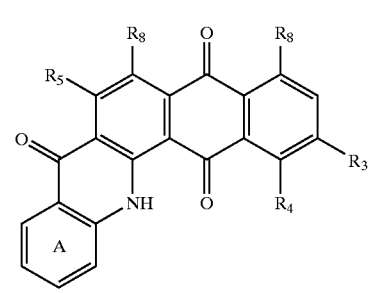

and subsequent reaction thereof with a carbonyl chloride to form the dye of the formula (1).

The compounds of the formula (50) are known or are preparable similarly to known compounds by generally known methods.

The high molecular weight organic substances are dyed with the dye of the formula (1) for example by mixing said dye into these substrates using roll mills or mixing or grinding apparatus whereby the dye is dissolved or finely dispersed in the high molecular weight material. The high molecular weight organic material with the admixed dye is then processed in a conventional manner, for example by calendaring, pressing, extrusion, spread coating, spinning, casting or injection moulding, whereby the dyed material acquires its ultimate shape. The admixing of the dye can also be effected directly prior to the actual processing step, for example by continuously metering a solid, for example pulverulent, dye and a granulated or pulverulent high molecular weight organic material and also optionally additional substances such as for example additives simultaneously directly into the inlet zone of an extruder where the mixing-in takes place just prior to the processing. In general, however, prior mixing of the dye into the high molecular weight organic material is preferable, since more uniformly dyed substrates are obtainable.

It is often desired to incorporate plasticizers into the high molecular weight compounds prior to shaping to produce non-rigid mouldings or to reduce their brittleness. Useful plasticizers include for example esters of phosphoric acid, phthalic acid or sebacic add. In the process of the present invention, plasticizers can be incorporated into the polymers before or after colorant has been incorporated. It is further possible, for the purpose of achieving different hues, to add to the high molecular weight organic substances not only the dye of the formula (1) but also further pigments or other colorants in any desired quantities, optionally together with further additives, for example fillers or siccatives.

Preference is given to colouring thermoplastics especially in the form of fibres. Preferred high molecular weight organic materials which are colourable according to the invention are in general polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS). Particular preference is given to polyester and polyamide. Very particular preference is given to linear aromatic polyesters obtainable by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBTP); polycarbonates, for example polycarbonates formed from α,α-dimethyl-4,4'-dihydroxydiphenylmethane and phosgene; or polymers based on polyvinyl chloride or polyamide, for example nylon 6 or nylon 66.

The present invention further provides a process for trichromatic dyeing of plastics or polymeric dye particles which is characterized in that it comprises mixing at least one blue-dyeing dye of the formulae (2), (3), (4), (5) or (6), at least one red-dyeing dye of the formulae (7), (8), (9), (10),

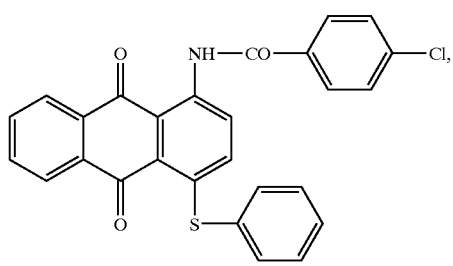
(11)

-continued

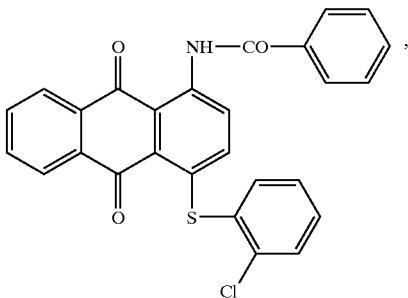
(12)

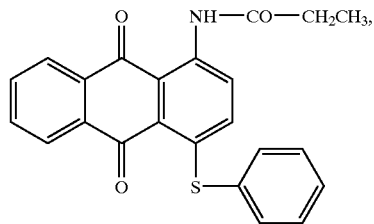
(13)

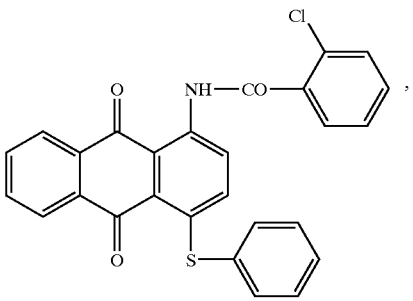
(14)

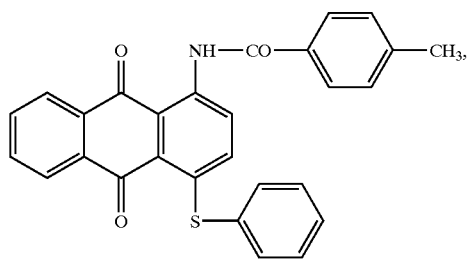
(15)

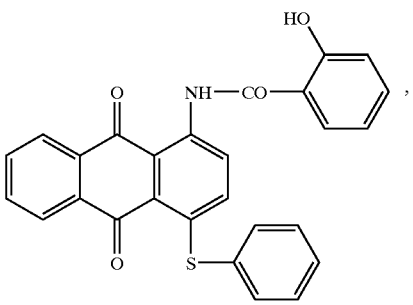
(16)

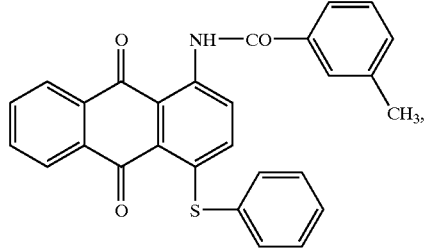
(17)

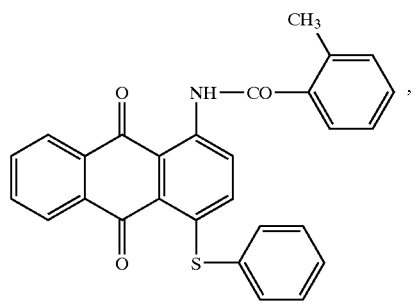
(18)

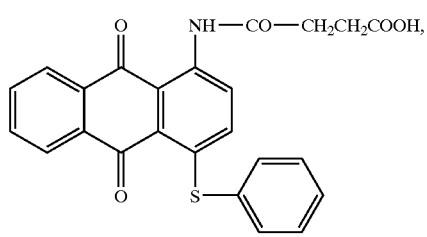
(19)

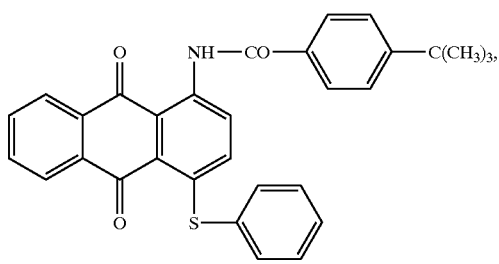
(20)

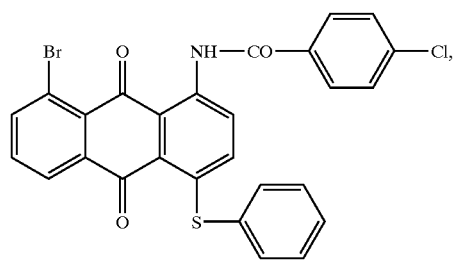
(21)

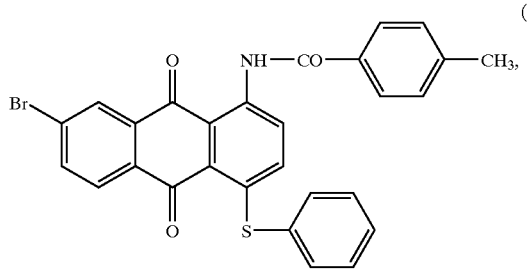
(22)

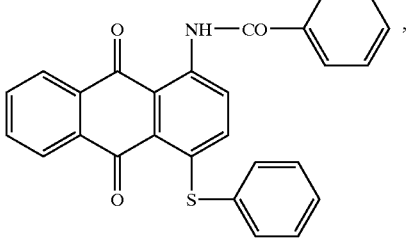
(23)

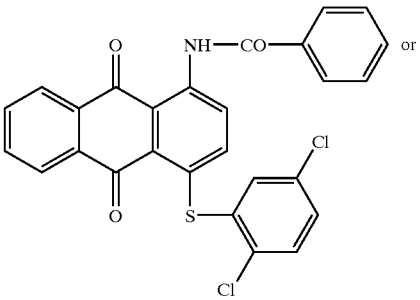
(24)

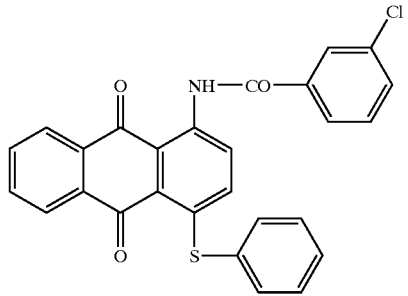
(25)

and the yellow-dyeing dye of the formula

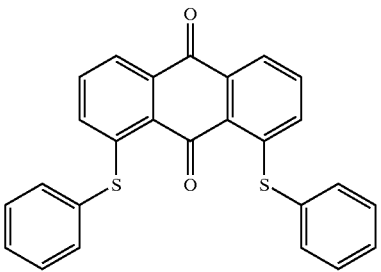
(26)

into the plastics or polymeric dye particles.

The dyes of the formula (11) to (26) are known or preparable similarly to known compounds by processes known per se.

Trichromism is the additive colour mixture of appropriately selected yellow- or orange-, red- and blue-dyeing dyes whereby any desired hue of the visible spectrum can be matched by suitable choice of the amount ratios of the dye components.

A preferred embodiment of the trichromatic process according to the invention is characterized in that the blue-dyeing dye of the formula (2) is used together with the red-dyeing dye of the formula (7) and the yellow-dyeing dye of the formula (26).

A further preferred embodiment of the trichromatic process according to the invention is characterized in that the blue-dyeing dye of the formula (2) is used together with the red-dyeing dye of the formula (14) and the yellow-dyeing dye of the formula (26).

The dyes used according to the invention confer on the aforementioned materials, especially the polyester and polyamide materials, strong level hues having good user fastnesses, especially very good light fastness.

The examples hereinbelow illustrate the invention. Parts and percentages are by weight, unless otherwise stated. Temperatures are in degrees Celsius. Parts by weight relate to parts by volume as the gram relates to the cubic centimeter.

EXAMPLE 1

A reaction vessel is charged with 145.0 parts by weight of concentrated sulfuric acid and 70.0 parts by weight of chlorosulfonic acid. 36.0 parts by weight of the compound of the formula

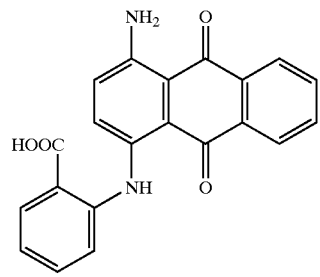

(52)

are added at 25° C. and the mixture is subsequently stirred at 25–30° C. for 2 hours. It is then discharged onto 1 500 parts by weight of ice water and the precipitated product is filtered off with suction, washed neutral and dried.

This provides 32.0 parts by weight of the compound of the formula

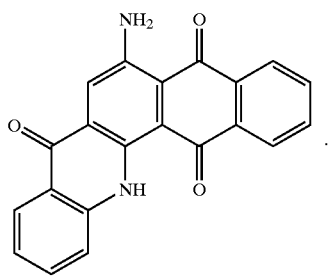

(53)

12.9 parts by weight of the compound of the formula (53) are introduced into 85 parts by weight of nitrobenzene and the mixture is heated to 130–140° C. A solution of 6.6 parts by weight of m-toluyl chloride in 12 parts by weight of nitrobenzene is added dropwise over about 30 minutes at 130–140° C. The mixture is subsequently stirred for 1 hour.

The reaction mixture is then cooled down to 20–40° C., filtered directly or after dilution with methanol, and the filter residue is washed with methanol and water and dried. This provides 14.8 parts by weight of the dye of the formula

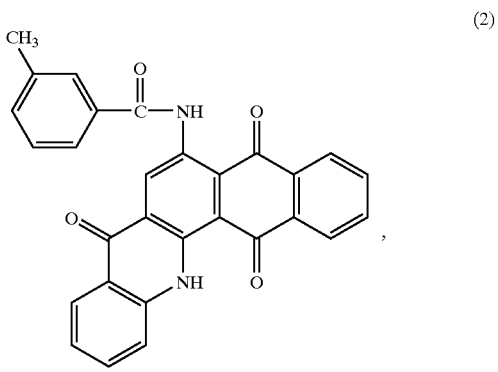

(2)

which dyes polyester in a lightfast blue shade.

EXAMPLE 2

1 200.00 g of polyester chips (PET Arnite D04-300, DSM) are predried at 130° C. for 4 hours are subsequently mixed with 0.24 g of the dye of the formula

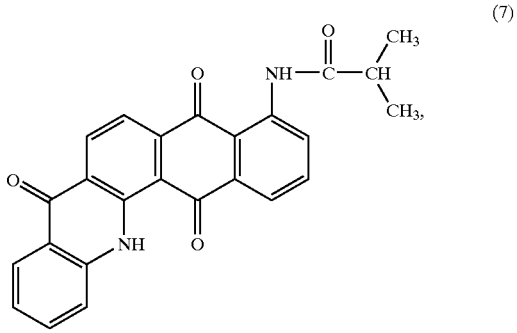

(7)

in a roller rack at 60 revolutions per minute for 15 minutes until homogeneous.

The homogeneous mixture is extruded on a twin screw 25 mm extruder from Collin, D-85560 Ebersberg comprising 6 heating zones at a maximum temperature of 275° C., quenched with water; pelletized in a Turb Etuve TE 25 pelletizer from MAPAG AG, CH-3001 Bern and subsequently dried at 75° C. hours.

This provides red polyester chips having good all-round fastnesses, especially very good light and hot light fastnesses.

EXAMPLE 3

1 200.00 g of polyester chips (PET Arnite D04-300, DSM) are predried at 130° C. for 4 hours and subsequently mixed with 0.64 g of the dye of the formula (2),
0.30 g of the dye of the formula (7) and
1.46 g of the dye of the formula (26)

in a roller rack at 60 revolutions per minute for 15 minutes until homogeneous.

The homogeneous mixture is extruded on a twin screw 25 mm extruder from Collin, D-85560 Ebersberg comprising 6 heating zones at a maximum temperature of 220° C., quenched with water, pelletized in a Turb Etuve TE 25 pelletizer from MAPAG AG, CH-3001 Bern and subsequently dried at 75° C. for 4 hours.

This provides grey polyester chips having good all-round fastnesses, especially very good light and hot light fastnesses.

EXAMPLE 4

1 200.00 g of polyester chips (PET Arnite D04-300, DSM) are predried at 130° C. for 4 hours and subsequently mixed with 2.40 g of the dye of the formula (2)
in a roller rack at 60 revolutions per minute for 15 minutes until homogeneous.

The homogeneous mixture is extruded on a twin screw 25 mm extruder (from Collin, D 85560 Ebersberg) comprising 6 heating zones at a maximum temperature of 220° C., quenched with water, granulated in a Turb Etuve TE 25 granulator (from MAPAG AG, CH 3001 Bern) and subsequently dried at 75° C. for 4 hours.

This provides blue polyester chips having good all-round fastnesses, especially very good light and hot light fastnesses.

What is claimed is:

1. A process for preparing dyed plastics characterized in that it comprises mixing a high molecular weight organic material with a coloristically effective amount of at least one dye of the formula

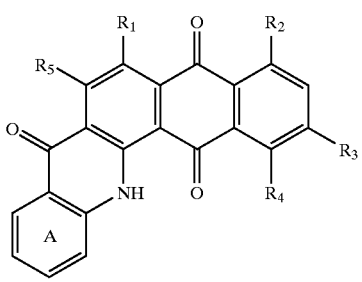

(1)

where

R$_1$ is hydrogen, hydroxyl or a radical —NHCO—R$_6$, where R$_6$ is C$_1$–C$_6$alkyl or unsubstituted or C$_1$–C$_4$alkyl- or halogen-substituted phenyl, R$_2$ is hydrogen, hydroxyl or a radical W—R$_7$, where W is —NHCO— or —S— and R$_7$ is C$_1$–C$_6$alkyl or unsubstituted or C$_1$–C$_4$alkyl- or halogen-substituted phenyl, R$_3$ is hydrogen, R$_4$ is hydrogen or hydroxyl, R$_5$ is hydrogen, or R$_3$ and R$_4$ combine to form the radical of the formula

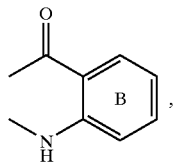

where the ring may bear further substituents, with the proviso, that at least one of the substituents R$_1$ to R$_4$ is not hydrogen.

2. A process according to claim 1, characterized in that dyes of the formulae

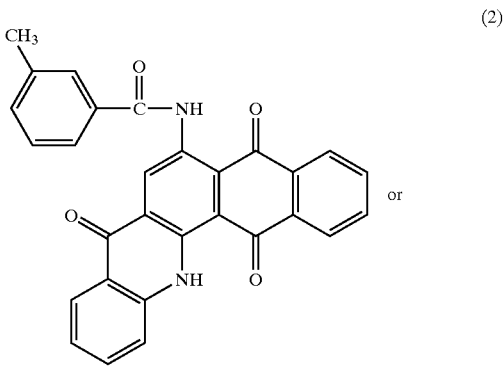

(2)

or

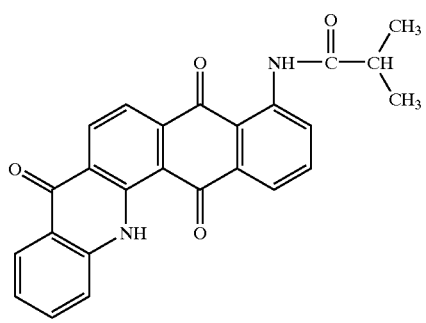

(7)

are used.

3. The dyed plastic prepared by the process of claim 1.

4. The dyed plastic prepared by the process of claim 2.

* * * * *